May 24, 1927.  1,629,707
F. S. HUDSON
AUTOMOBILE DRIVING MECHANISM
Filed Sept. 28, 1925      2 Sheets-Sheet 1

INVENTOR.
Finn S. Hudson
BY Warren D. House
His ATTORNEY.

Witness:
R. E. Hamilton

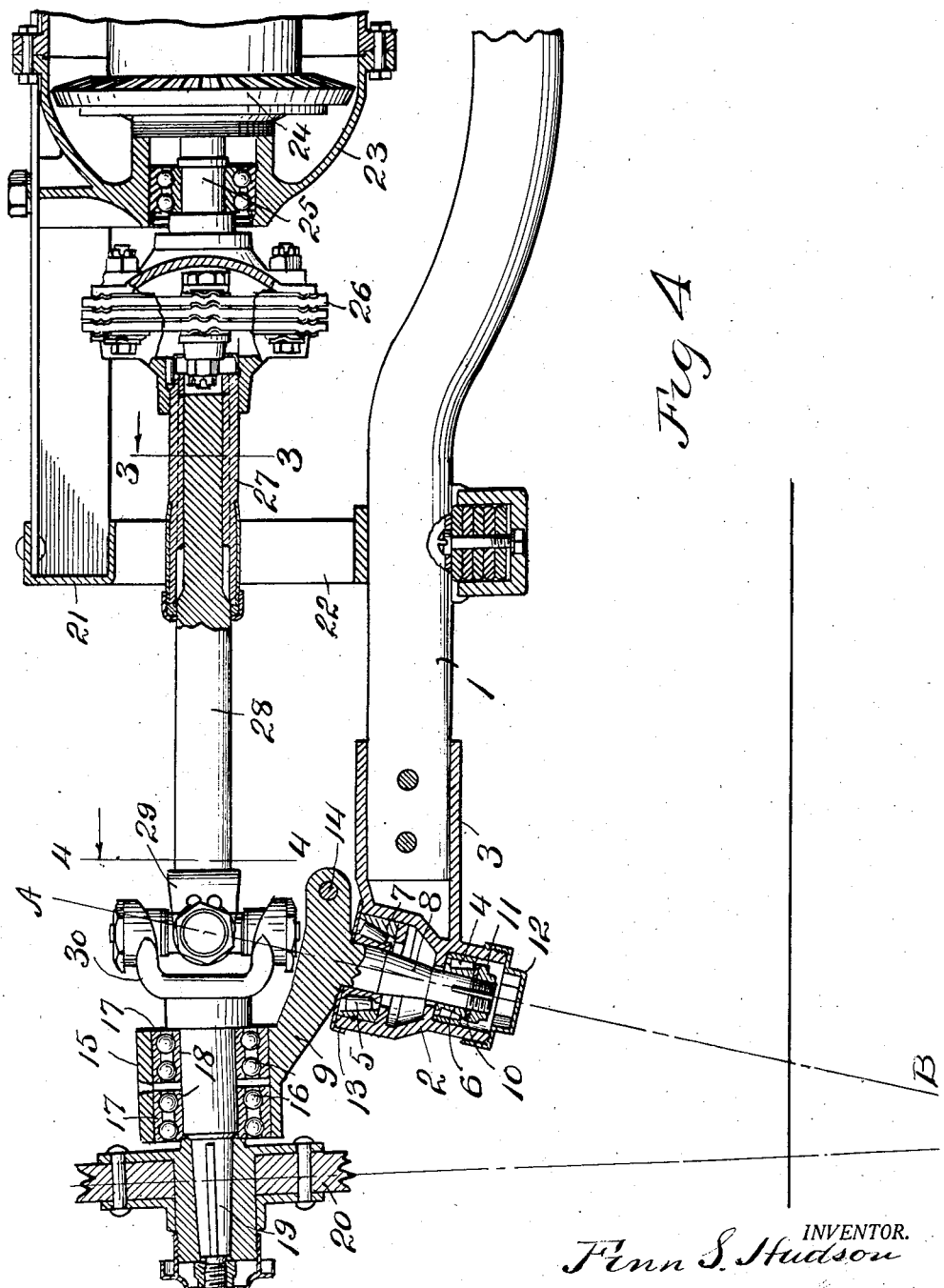

Patented May 24, 1927.

1,629,707

UNITED STATES PATENT OFFICE.

FINN S. HUDSON, OF KANSAS CITY, MISSOURI.

AUTOMOBILE DRIVING MECHANISM.

Application filed September 28, 1925. Serial No. 59,145.

My invention relates to improvements in automobile driving mechanisms. It may be utilized for either a front or rear axle driving, but is particularly well adapted for use as a front axle driving mechanism.

It relates particularly to the type of driving mechanisms in which the wheel spindle is rotatably mounted on a spindle arm pivoted to the axle and connected by a universal joint with a shaft driven by a flexible joint which is driven by differential driving gearing.

One of the objects of my invention is to provide a novel driving mechanism in which the spindle arm is pivoted on an axis inclined to the vertical, so that the carrying wheels always tend to assume the straight ahead position, and in locating the point of intersection of the axes of the universal joint in substantial alinement with the axis of the spindle arm, whereby the longitudinal movement of the shaft which rotates the wheel spindle will be reduced to the minimum.
A further novel feature of my invention is in the disposing of the axis of the spindle arm so that it intersects the plane of the wheel tread at a point below the tread, thereby providing a structure in which there is ample room for wide bearings, which is simple, cheap, durable, strong and not liable to get out of order.

The novel features of my invention are hereinafter fully described and claimed.
In the accompanying drawings, which illustrate my improved driving mechanism as applied to a front wheel drive, and which is the preferred embodiment of my invention, Fig. 1 is a front elevation of my improved driving mechanism, with a portion of the automobile frame shown in vertical section.

Fig. 4 is an enlarged vertical sectional view of a part of the frame, front axle, one carrying wheel and differential gearing, and the part of my improved driving mechanism at one side of the differential gearing.

Similar characters of reference designate similar parts in the different views.

Figure 1:
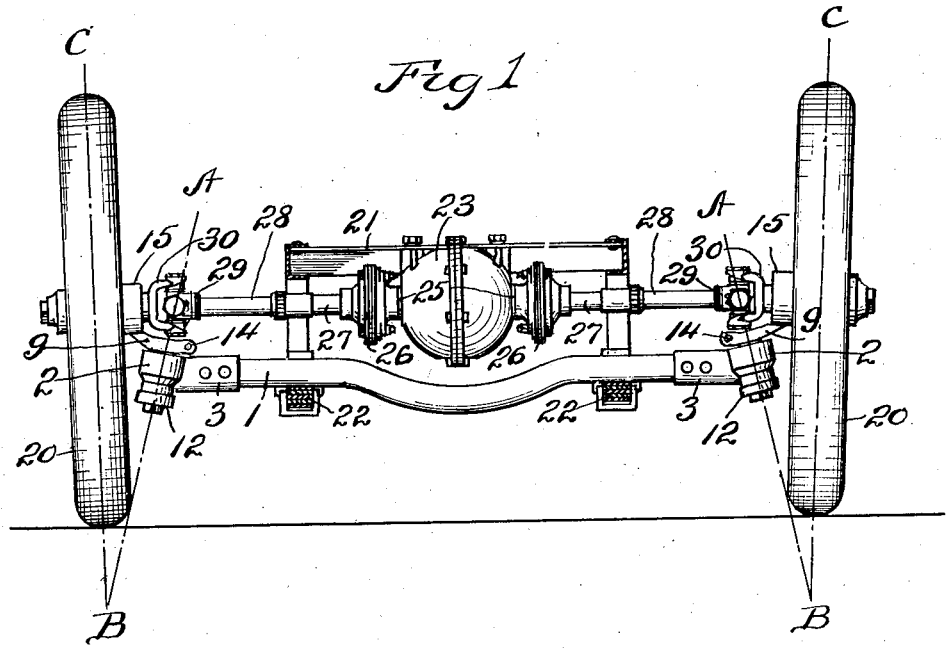
Figure 2:
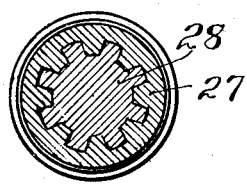
Fig. 2 is an enlarged cross section on the line 2—2 of Fig. 4.
Figure 3:
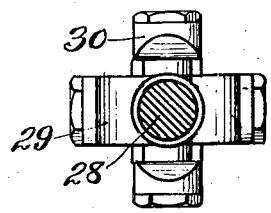
Fig. 3 is a cross section on the line 3—3 of Fig. 4.

1 designates the body of the front axle, which at each end is circular and provided with a bearing mechanism comprising a housing 2 having a sleeve 3, which is fitted on and rigidly secured to the adjacent end of the body 1. By having the ends of the axle 1 circular, the sleeves 3 may be turned thereon to their proper positions and then fastened therein in any suitable manner, thereby assuring proper operative positioning of the housings 2. In each housing 2 is provided anti-friction bearing means of any usual type, and which, as shown, comprises two sets of rollers 4 and 5 respectively mounted on two cones 6 and 7, which are mounted on a stem 8 of a spindle arm 9, said spindle stem extending into the housing 2, and inclining from the vertical downwardly and outwardly. The lower end of the stem 8 is threaded and has fitted on it a lock washer 10, which bears against the cone 4, and a nut 11, which bears against the washer 10.

The lower end of the housing 2 is threaded and has fitted thereon a screw cap 12. Fitted on the stem 8, bearing against the cone 5 and covering the upper end of the housing 2 is a dust cap 13.

Each spindle arm 9 has fastened to it a rod 14, which forms a part of the usual steering mechanism.

Each spindle arm 9 has an annular upper end, which forms a housing 15 for suitable anti-friction bearing means of any usual type, that shown comprising two sets of balls 16 mounted in the usual manner in two bearing rings 17 respectively, and respectively mounted on bearing rings 18, which are mounted on the adjacent one of two wheel spindles 19, of usual type and which have respectively fitted thereon and splined thereto the two front carrying wheels 20.

As shown in Fig. 4, the hub of the wheel 20 is fitted for substantially its full length on the spindle 19 and wholly at the outer side of the spindle arm and independent thereof, whereby anti-friction bearing means is required only between the spindle and the spindle arm for supporting the latter, and affording a maximum of strength, rigidity and simplicity and a minimum of looseness and parts subjected to wear, and providing a structure which is cheap, durable and not liable to get out of order.

21 designates the frame of the vehicle, which is supported in the usual manner on springs 22 carried by the axle body 1. Supported by and depending from the frame 21 is a differential housing 23, in which is mounted in the usual manner an ordinary type of differential gearing 24, provided with the usual two independently driven shafts 25, which are respectively in driving engagement with two flexible disk joints 26, of ordinary well known construction, and which are respectively connected to and rotatable with two sleeves 27, which are respectively splined to and rotate with two driven shafts 28, which are respectively longitudinally slidably fitted in said sleeves 27.

Two universal joints, which may be of usual type, respectively connect the driven shafts 28 with the wheel spindles 19 which are adjacent thereto. As shown, each universal joint has two yokes 29 and 30 respectively secured to and rotatable with the adjacent driven shaft 28 and the adjacent wheel spindle 19, said yokes being pivotally connected in the usual manner on two axes at right angles to each other, the point of intersection of said axes being, as indicated by the line A—B in Fig. 4, in substantial alinement with the axis of the adjacent spindle stem 8.

By locating the point of intersection of the axes of each universal joint in substantial alinement with the axis of the adjacent spindle stem 8, the sliding movement endwise of the driven shafts 28 in the sleeves 27 is reduced to a minimum when the front wheels 20 are turned from the straight ahead position in steering, such sliding movement as occurs being only that due to deflection of the parts in travel and slight inaccuracies of manufacture and assemblage, and not interfering with easy steering.

In the operation of the invention, the driven shafts 28 are rotated by the sleeves 27 respectively, the latter being respectively rotated by the flexible disk joints 26, which derive their rotation respectively from the shafts 25 of the differential gearing. The rotation of the driven shafts 28 effects rotation of the wheel spindles 19 and the wheels 20, through the intermediacy of the universal joints respectively attached to said wheel spindles.

When the wheel spindles 19 are turned from the straight ahead position, either to the right or to the left, the spindle arms 9, due to the inclination of the stems 8 thereof, slightly lifts the axle 1 and the load carried by the axle. Such lifted weight tends to swing the spindle arms and the wheel spindles and wheels 20 to the straight ahead position.

By locating the universal joints in the positions described, ample room is provided for wide bearings between the wheels 20 and said joints, and a simple, cheap, strong and efficient structure is afforded.

In Figs. 1 and 4, the lines C—B are the central longitudinal planes of the wheels 20. It will be noted that, as shown in Fig. 1, the axes A—B of the spindle arms 9 intersect the wheel planes C—B at points below the treads of the wheels 20. This construction permits of less angularity of the stems 8, while retaining the universal joints 29—30 in alinement with the axes A—B, and well removed from the wheels 20, thus affording ample space for wide bearings between the wheels 20 and the universal joints, and by the reduction in angularity of the stems 8, reducing the lift of axle 1 and parts carried thereby when the wheels are turned from straight ahead. The steering is thus rendered easier than would be the case with greater angularity of the stems.

Such intersection of the axes A—B with the wheel planes C—B below the treads of the wheels, also tends to balance the torque due to the rolling resistance of the wheels, which tends to throw the wheels 20 outwardly, and the torque due to the driving power transmitted to the wheels through the driven shafts 28, which always tends to throw the wheels inwardly.

I do not limit my invention to the structure shown and described, as many modifications, within the scope of the appended claims, may be made without departing from the spirit of my invention.

What I claim is:

1. In an automobile driving mechanism, an axle, a spindle arm pivoted thereto on an axis inclined to the vertical, a wheel spindle rotatable on said spindle arm, a universal joint connecting with said wheel spindle and having its axes intersecting the axis of the spindle arm, and a carrying wheel having its hub fitted for substantially its full length on and revoluble with said spindle wholly at the outer side of the outer end and independent of said spindle arm.

2. In an automobile driving mechanism, a driven shaft, an axle, a spindle arm pivoted to said axle on an inclined axis, and having a housing, a wheel spindle extending through and rotatable in said housing, antifriction bearing means supporting said housing on said wheel spindle, a universal joint connecting said wheel spindle and said driven shaft with its axes intersecting the axis of said spindle arm, and a carrying wheel having its hub fitted for substantially its full length on and revoluble with said spindle wholly at the outer side of the outer end and independent of said spindle arm housing.

In testimony whereof I have signed my name to this specification.

FINN S. HUDSON.